Figure 4:
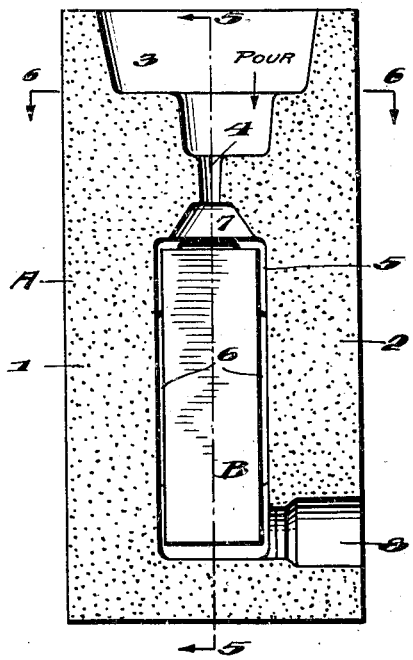

May 3, 1949.  E. F. BEGTRUP  2,469,062
APPARATUS FOR FULL FUSION WELDING OF RAILS
Filed Oct. 14, 1944  4 Sheets-Sheet 1
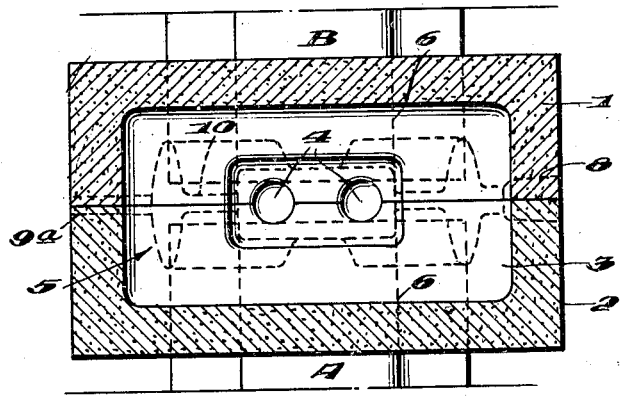
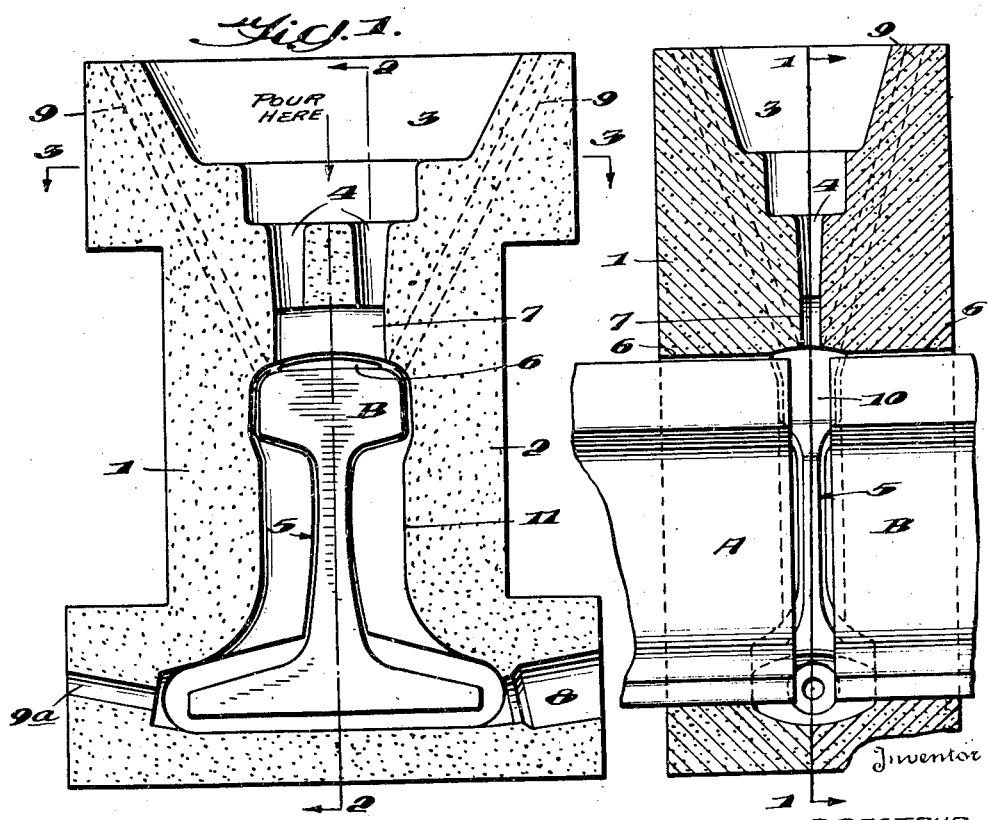
Inventor
EDWARD F. BEGTRUP,
By Henry C. Parker
Attorney May 3, 1949. E. F. BEGTRUP 2,469,062
APPARATUS FOR FULL FUSION WELDING OF RAILS
Filed Oct. 14, 1944 4 Sheets-Sheet 2

Inventor
EDWARD F. BEGTRUP,
By Henry C. Parker
Attorney

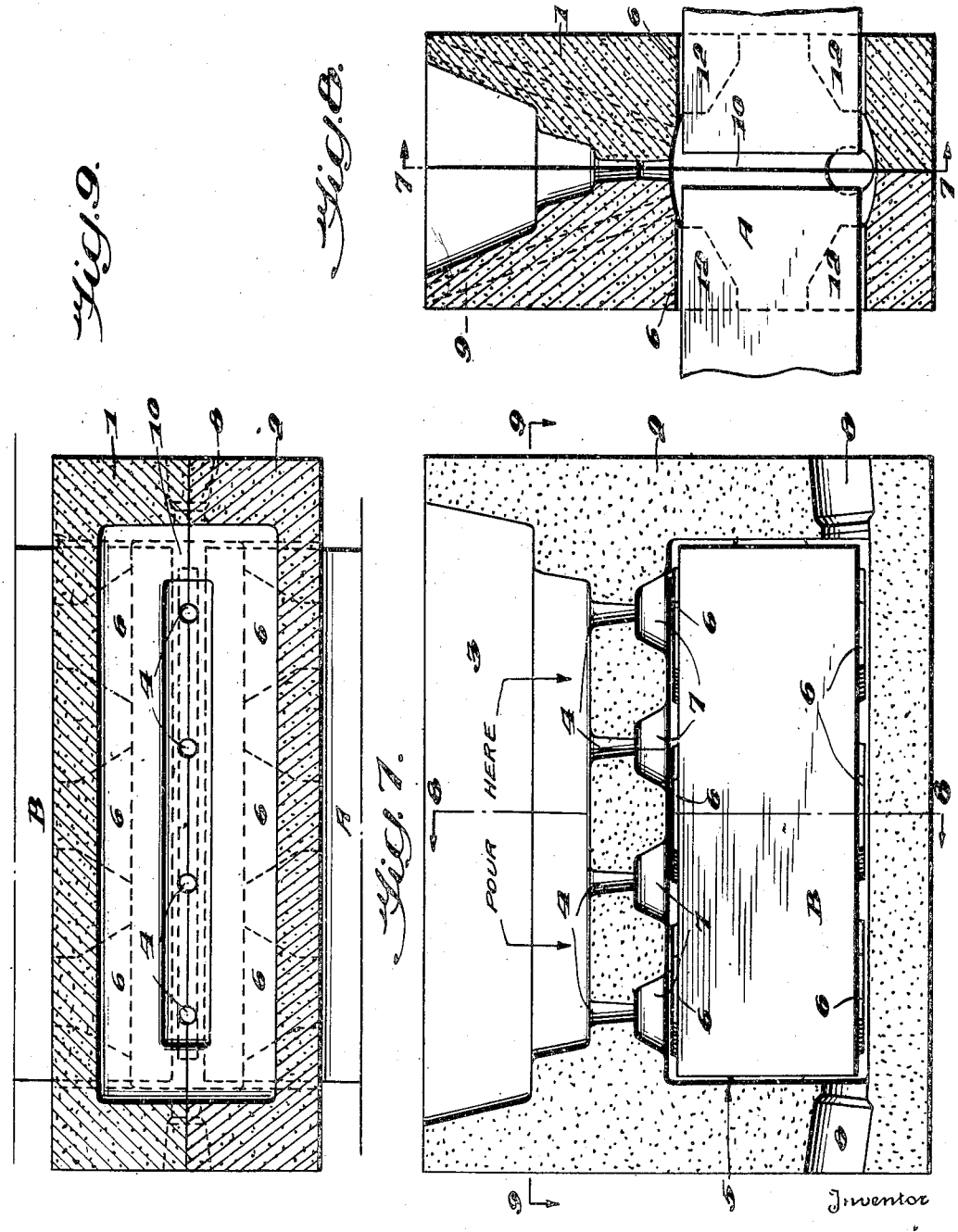

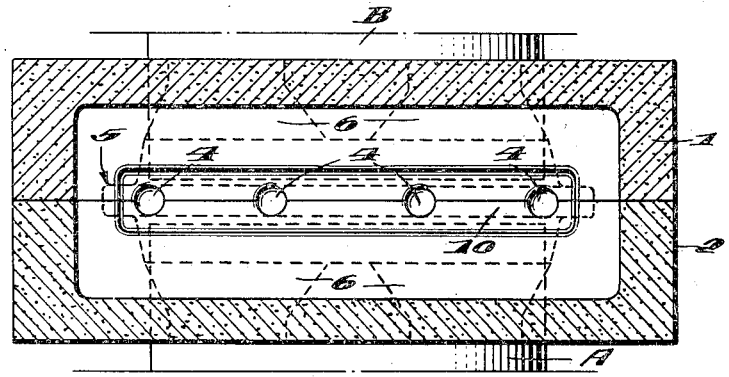
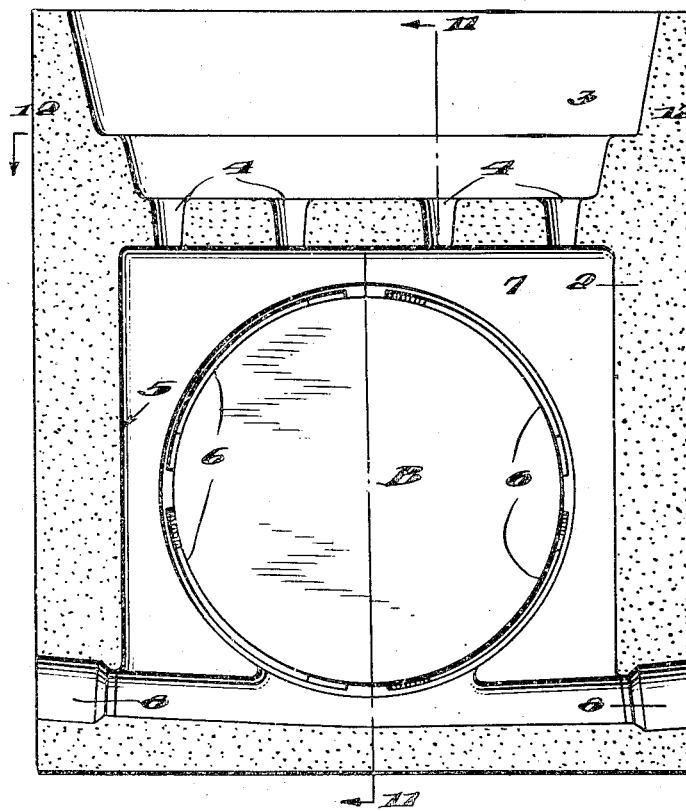
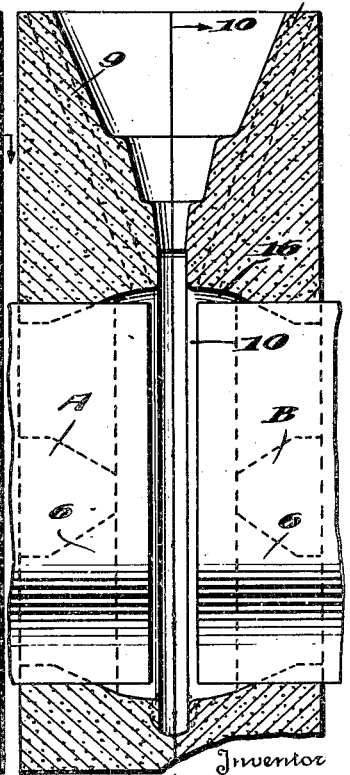

Patented May 3, 1949

2,469,062

UNITED STATES PATENT OFFICE 2,469,062

APPARATUS FOR FULL FUSION WELDING
OF RAILS

Edward F. Begtrup, Elizabeth, N. J.

Application October 14, 1944, Serial No. 558,703

5 Claims. (Cl. 22—116)

This invention relates to method of and apparatus for full fusion welding; and it comprises a mold used in the full fusion welding of metal parts, such as rails, which mold comprises mold sections adapted to surround and enclose the ends of the metal parts to be welded which metal parts are aligned end to end with a welding gap therebetween, said mold sections defining an upper pouring basin and a mold cavity having a fusion collar-forming portion about said welding gap, and at least one pouring gate connecting said pouring basin with the top of said mold cavity and having a width, measured across the gap, which is not substantially greater than the width of the gap after the pre-heating of the rails, and a directional channel forming an extension of said pouring gate expanded in the direction of the welding gap but having transverse vertical walls on either side of said gap spaced apart a distance not substantially greater than the width of the gap said pouring gate and said directional channel being adapted to conduct molten metal from the pouring basin in a freely falling stream, non-spattering transversely to the gap, passing through said welding gap to the bottom of the mold cavity substantially without contacting the parts to be welded, said directional channel also being adapted to collect slag inclusions and gases from the metal during the welding operation. The invention also includes a welding process wherein the metal parts to be welded are aligned end to end, leaving a welding gap therebetween, the described mold is constructed about the resulting joint, the parts are preheated by passing gases through said mold cavity and the welding gap, superheated molten metal is introduced into said pouring basin, passed through said pouring gate and through said directional channel in a freely falling stream, non-spattering transversely to the gap, through the welding gap and to the bottom of the mold cavity, said mold cavity, including said directional channel being filled with molten metal, the molten metal being then allowed to solidify; all as more fully hereinafter set forth and as claimed.

The alumino-thermic method of welding metal parts has been in use for many years. The first method developed for this purpose was the so-called full fusion welding method, in which a gap was left between the parts to be welded, this gap being cast full of alumino-genetic metal which then formed the desired weld. This welding method has been widely applied to the welding of rails, for example, and is still in rather widespread use in spite of competition from more recently developed welds, particularly from the so-called pressure-fusion weld, in which the webs and bases of the rails only are united by cast metal while the heads are heated to welding temperatures by heat derived from the aluminothermic charge and welding is produced by the application of pressure.

Several improvements have been made in the full fusion welding method as originally conducted for welding rails. The molds which were first employed in this method usually directed the molten metal through the gaps between the rails in such manner that the metal came in contact with the rail heads, webs and/or base flanges on its way to the bottoms of the molds, thereby losing its superheat, causing some washing away of rail metal and producing difficulties from improper fusion and unwelded areas at the bases of the rails. It was found that this difficulty could be avoided by constructing the molds in such fashion that the metal was directed through pouring gates or channels of various types around the rail heads without contacting the rail metal. However, these improvements introduced another difficulty, namely the proper heating of the rail heads to produce perfect welding. The heads of rails have heat capacities which are several times those of the webs and bases and the problem of supplying adequate heat to bring them to welding temperatures without overheating the webs and bases has always presented difficulties. Various expedients and complicated mold designs have been employed in order to remedy these difficulties but all of these devices have left at least something to be desired. At times and under adverse conditions difficulties have been encountered from locked-up stresses, slag inclusions, shrinkage cavities and cold-shuts or unwelded areas.

I have found that, if the molten meltal of the alumino-thermic charge is passed in at least one freely falling stream, non-spattering transversely to the welding gap, through the gap directly to the bottom of the mold, satisfactory welds are produced which are free from the faults mentioned. When parts of large cross section are to be welded a plurality of freely falling streams arranged in multiples should be provided which are spaced sufficiently close to prevent any substantial cross flow of weld metal or washing of the metal between the streams. In the case of rails, for example, I have found it advisable to provide a pair of pouring gates, the directional flow channel in this case usually taking the form of a slot extending between and connecting the lower ends of the pouring gates. In the case of metal parts having still larger cross sections a correspondingly greater number of pouring gates should be employed with directional channels which may or may not join each other.

My directional flow channel has three important functions. One is to prevent spattering of the metal transversely to the welding gap. If the molten weld metal spatters transversely to the gap, particles of weld metal tend to adhere to and solidify on the metal parts to be welded. These particles may not be washed away and remelted by the weld metal as it fills the welding gap and hence they may form slag inclusions and unwelded spots. I have found that this spattering is prevented by the vertical walls of the directional flow channel provided these walls have a height above the welding which is not substantially less than the width of the gap.

When the stream of molten weld metal passing through the pouring gate reaches my directional channel, it tends to fall freely spreading laterally but not transversely to the gap owing to the confining vertical walls of the channel. Any particles of weld metal which may separate from the stream transversely to the gap tend to strike the vertical walls and are then deflected back into the stream. If any such particles separate from the molten stream below the channel, their velocity by that time has reached the point at which, if they should strike the parts to be welded at all, the angle of incidence would be so small that they would not adhere.

Another function of my directional flow channel is to form a space within which slag and other light impurities can collect as the weld metal fills the welding gap, that is, it functions as a riser. However, I usually provide one or more additional risers connected with the top of the mold cavity in order to ensure a weld free from all inclusions.

My directional channels perform still another function. During the pour the lower ends of all types of pouring gates become enlarged. In the absence of my channels the widths of the discharge openings of the pouring gates may enlarge sufficiently so there is a danger that some metal may contact the rail heads before the mold cavity becomes filled. But when the channels are employed the pouring gates tend to enlarge laterally without substantially increasing in width. Thus the channels tend to prevent contact of the poured metal with the metal parts towards the end of the pour.

My mold is also provided with one or more preheating vents or slots which are described more completely and claimed in my copending application filed on June 29, 1944, Serial Number 542,653, now Patent No. 2,416,863, issued March 4, 1947. These preheating vents conduct preheating gases from the mold cavity in contact with the parts to be welded and laterally out of the mold on either side. They are advantageously placed in such fashion that parts of larger cross section are contacted with proportionally larger volumes of preheating gases, thus tending to produce uniform preheating of the parts to be welded even when these are of irregular cross section.

In constructing the mold it is important to have the edges of all flow passages, through which molten weld metal passes, rounded or filleted. When molten metal passes from an orifice having sharp edges, spattering tends to take place and this can be prevented if these edges are filleted. I therefore prefer to fillet the edges of the orifices, formed at the points where the pouring gates meet the flow channels.

By the use of the mold and process described it is possible to produce rail and other welds which are radiographically sound, reliably and reproducibly. This was not always possible with the molds which have been described previously in the art.

Figure 13:
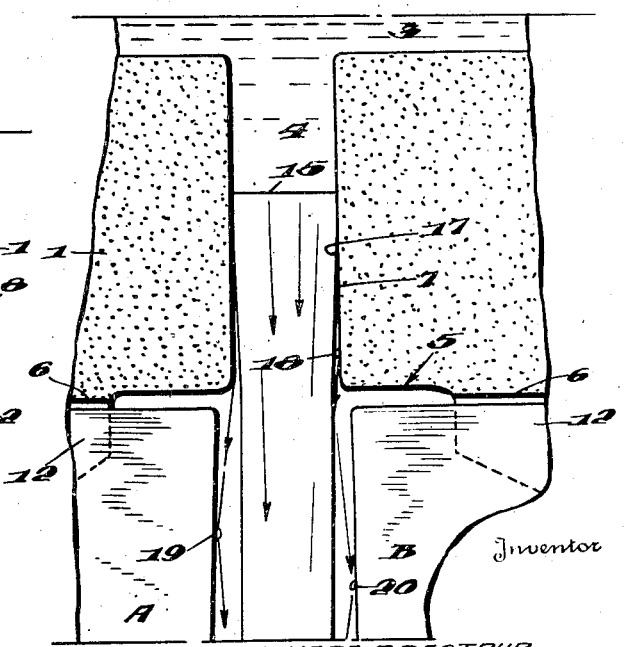

My invention can be described in somewhat greater detail by reference to the accompanying drawing which shows, more or less diagrammatically, several modifications of a mold positioned about a joint between metal parts to be welded. In this showing, Fig. 1 represents a vertical section through a mold adapted for rail welding showing the end of one rail in position for welding, the showing being taken through the joint between two rails along the line 1—1 of Fig. 2, Fig. 2 is a similar section taken at right angles to that of Fig. 1 along the line 2—2 of the latter figure, Fig. 3 is a horizontal section of the same mold taken along the line 3—3 of Fig. 1, Fig. 4 is a vertical section through a mold adapted to be used in welding a metal beam or bar, one end of which is shown in welding position, Fig. 5 is a similar section taken at right angles to those of Fig. 4, taken along the line 5—5 of Fig. 4, Fig. 6 is a horizontal section through the same mold taken along the line 6—6 of Fig. 4, Fig. 7 is a vertical section through a mold adapted to be used in welding a metal beam of large cross section, one end of the beam being shown in welding position, taken along the line 7—7 of Fig. 8, Fig. 8 is a similar showing at right angles, taken along the line 8—8 of Fig. 7, Fig. 9 is a horizontal section through the same mold, taken along the line 9—9 of Fig. 7, Fig. 10 is a vertical section through a mold adapted to be used in the welding of a metal shaft, one end of which is shown in welding position, the showing being taken along line 10—10 of Fig. 11, Fig. 11 is a vertical section taken at right angles to that of Fig. 10, taken along the line 11—11 of Fig. 10, Fig. 12 is a horizontal section of the same mold taken along the line 12—12 of Fig. 10, Fig. 13 is a diagrammatic vertical partial section on an enlarged scale through a mold, showing a stream of molten weld metal passing through a pouring gate and the directional flow channel of the present invention and indicating the function of the latter.

In the various figures like parts are designated by like reference numerals. In each of the figures the parts to be welded are designated by A and B, while the mold sections are shown at 1 and 2. The mold is formed with a pouring basin 3, a pouring gate or gates 4 and a mold cavity shown generally at 5, and equipped with the preheating slots or vents 6. The directional flow channels of the present invention are shown at 7, while the preheating gates are indicated at 8 and the risers at 9. The welding gap between the parts to be welded is shown at 10.

Figure 5:
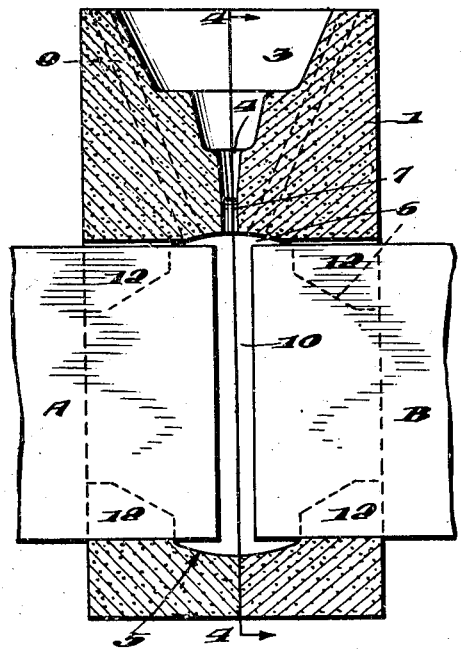
Figure 6:
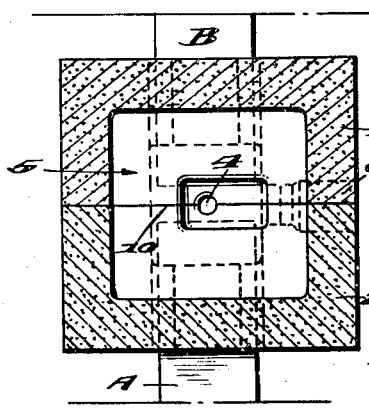

It will be noted that the mold of Figs. 4, 5 and 6 is provided with a single pouring gate and directional flow channel, that the mold of Figs. 1, 2 and 3 has a pair of pouring gates connected by a single directional channel, while the molds of Figs. 7, 8 and 9 and of Figs. 10, 11 and 12 are each provided with four pouring gates. Four directional channels are provided in the mold of Figs. 7, 8 and 9, while a single wide slot serves as a directional channel in the mold of Figs. 10, 11 and 12.

The rail welding mold cavity of Figs. 1, 2 and 3 is provided with bracket-forming sections 11 through which the weld metal passes on either side of the rail webs on its way to the bottom of the mold. These sections confine the streams of weld metal and prevent spattering as the streams pass through the welding gap between the base flanges of the rails and, of course, they prevent contact of the streams with the rail webs. These sections serve to form brackets on the fusion collar of the weld and these brackets are important strengthening elements. The fusion collar forming part of the mold cavity extends entirely around the heads, webs and base flanges of the rails.

It will be noted that the preheating vents usually taper from the mold cavity towards their exits on either side of the mold. It is evident, of course, that these preheating vents cannot extend around the entire surface between the parts to be welded and the mold since then there would be no points of contact between the mold and these parts in order to provide proper spacing and support. In other words several islands of contact between the mold and the parts to be welded must be left, these islands being shown at 12. In the mold shown in Figs. 1, 2 and 3 there is only one preheating vent provided, this being along the tops of the rail heads; hence the contact between rails and mold is adequate and no special islands of contact need to be provided.

In the welding of parts of large cross section it is desirable to provide as great an area of contact as possible between the parts and the preheating vents in order to speed up the preheating operation. It has been found that the preheating time can frequently be reduced by 50 per cent or more with the use of these vents. Moreover it has been found that the thickness of the fusion collar can be reduced considerably when these preheating vents are employed.

In the absence of the preheating vents the fusion collar must be sufficiently thick so that welding is perfect at the margins of the fusion collar at the point where this collar unites with the rail metal. There is a tendency for the weld metal to cool and solidify without welding as it passes into a narrow fusion collar-forming section of the mold, resulting in undercutting of the fusion collar and rough unwelded margins. However, when preheating vents are employed, the weld metal enters these vents for a short distance before it solidifies and this excess can be readily trimmed off back to the fusion collar proper, this procedure leaving a margin about the fusion collar which is perfectly welded.

It is desirable to taper the width of the preheating vents as indicated in Figs. 5, 8 and 11 for the reason that this subjects a maximum area of the parts to be welded in the neighborhood of the weld to the action of the preheating gases. Moreover these gases are cooled somewhat as they pass through the vents and hence their volume tends to decrease.

Fig. 13 shows diagramatically what happens when a stream of molten weld metal flows through one of my directional flow channels. The metal should be poured in such fashion that it forms a pool of metal in the lower part of the pouring basin 3 and the pouring gate should be sufficiently restricted so that this pool is not completely drained away until the end of the pour. This metal flows down through the pouring gate and, when it reaches the orifice which is formed at the junction 15 of the pouring gate with the directional channel it forms the freely falling stream 16. This stream tends to spread laterally somewhat in the direction of the channel, as indicated in Figs. 1, 4, 7 and 10, but not transversely to the welding gap owing to the confining effect of the vertical walls 16 and 17. The freely-falling stream of metal probably tends to contract slightly after leaving the orifice as shown in the figure. The action of the walls 16 and 17 in prevention transverse spattering is illustrated in the figure, where 18 represents a drop of metal which has separated from the body of metal to strike wall 17 but which is immediately deflected back into the stream by the wall as shown. Two other drops of metal 18 and 19 are shown striking the parts to be welded but, as illustrated, it is evident that any such drops would strike the parts at such a small angle of incidence and at such a high velocity that they would tend to be deflected back into the stream rather than to stick to the metal.

As shown in Fig. 13 and in the other figures the depth of the fusion collar forming space 5 needs to be little if any greater than the depth of the preheating vents 6. It is advantageous to make the depth of the preheating vents such that the weld metal which enters them is congealed within a short distance of the mold cavity. This makes the vents self-plugging. It is possible, of course, to plug these vents just before the weld metal is poured. Metal strips can be used for this purpose if desired but it is somewhat more convenient to lute them with the usual ceramic material.

While I have described what I consider to be the best embodiments of my welding mold and process, it is evident, of course, that various modifications can be made in the specific constructions and procedures disclosed without departing from the purview of this invention. It is evident from the preceding description that my invention involves the following novel features taken either along or in combination:

1. The step of pouring superheated weld metal from one or more pouring gates of a mold in a thin stream or streams through a welding gap between the parts to be welded and then to the bottom of the mold without contacting the metal parts.

2. The use of pouring gates adapted to direct thin streams of weld metal between the heads of the two rails to be welded then through narrow bracket-forming sections of the mold on either side of the rail webs and then to the bottom of the mold without contacting rail metal.

3. The use of a directional flow channel between the discharge end of a pouring gate and the top of the mold cavity, forming a lateral expansion of said pouring gate but having vertical walls spaced apart a distance not substantially greater than the width of the welding gap and adapted to prevent spattering transversely to the welding gap, said flow channel also serving as a riser to collect slag and other light impurities.

Each of the above features may be modified in various ways within the purview of this invention. Several modifications have already been described. It is evident, of course, that the dimensions and shape of the fusion collar forming section of the mold can be varied widely within the skill of the art and to suit various purposes and shapes of metal parts. The pouring gates can be made either circular, elliptical or rectangular in cross section. The bracket-forming sections of the mold of Figs. 1 to 3 can be varied in size and shape. The directional flow channel can be made somewhat narrower than the pouring gates, if desired, but usually it has about the same width.

My process is, of course, as applicable to the girder type of rail as well as to the T-type, as will be evident to those skilled in this art. This process is applicable to the welding of metal parts of widely different dimensions and shapes. It is believed that the specific examples given are adequate to teach the art how metal parts in general can be welded using the features of this invention. The dimensions shown in the various figures of the drawing, with the exception of Fig. 13, are relatively to scale. The mold shown in Figs. 7, 8 and 9 is suitable for the welding of a bar having dimensions of about 4x12 inches, for example. The dimensions of the mold of Figs. 1 to 3 can be varied to suit the gauge of the rails to be welded.

The welding gap used in rail welding can be varied in width from about ⅜ to 1½ inches. For reasons of economy, however, the width of the gap usually does not exceed ¾ inch. And, as indicated previously, for best results the width of the pouring gates and the width of the directional flow channel should not be substantially greater than the width of the gap. While I have described my invention particularly in connection with the use of the alumino-thermic welding method, it is evident, of course, that my mold and process are equally adapted for use with superheated weld metals derived from any source. Other modifications of my invention which fall within the scope of the following claims will be immediately evident to those skilled in this art.

What I claim is:

1. A mold for the full fusion welding of metal parts using superheated weld metal which comprises mold parts adapted to surround and enclose the ends of two metal parts to be welded which are aligned end to end with a welding gap therebetween, said mold parts defining an upper pouring basin and a mold cavity having a fusion collar-forming section surrounding said welding gap, at least one pouring gate having a directional flow channel connecting said pouring basin with said mold cavity positioned and dimensioned in such manner that weld metal passes through said welding gap between the metal parts to be welded without contacting said metal parts, said directional flow channel being positioned between said pouring gate and said fusion collar-forming section of said mold cavity with a vertical dimension not substantially less than the width of the welding gap and being in the form of a slot beneath the lower end of said pouring gate running in the direction of the welding gap and being provided with substantially vertical walls on either side of said welding gap spaced apart a distance not greater than the width of said welding gap, whereby spattering of weld metal on the metal parts is prevented.

2. The mold of claim 1 wherein a plurality of pouring gates is provided and said directional flow channel is a slot connecting the discharge ends of said gates.

3. The mold of claim 1 wherein a plurality of pouring gates is employed each provided with a separate directional flow channel.

4. A mold for the full fusion welding of rails which comprises mold parts adapted to surround and enclose the ends of two rails which are aligned end to end with a welding gap therebetween, said mold parts defining an upper pouring basin and a mold cavity having a fusion collar-forming section about the base flanges, the webs and the heads of said rails, at least one pouring gate connecting said pouring basin with the top of the mold cavity directly above the welding gap between the rail heads and a directional flow channel positioned between said pouring gate and said fusion collar-forming section of said mold cavity with a vertical dimension not substantially less than the width of the welding gap and forming a slot beneath the lower end of said pouring gate running in a direction parallel to said gap but having substantially vertical walls on either side of said gap spaced apart a distance less than the width of said gap, said directional flow channel and said pouring gate being so constructed and arranged that the weld metal flowing therefrom passes through said welding gap between the rail heads directly to the bottom of the mold cavity without substantially contacting rail metal, spattering of weld metal on the rails being prevented by said directional flow channel.

5. A mold for the full fusion welding of rails which comprises mold parts adapted to surround and enclose the ends of two rails which are aligned end to end with a welding gap therebetween, said mold parts defining an upper pouring basin and a mold cavity having a fusion collar-forming section about the base flanges, the webs and the heads of said rails, a pair of pouring gates connecting said pouring basin with the top of the mold cavity directly above the welding gap between the rail heads, a directional flow channel in the form of a slot positioned between the lower ends of said pouring gates and the fusion collar-forming section of said mold cavity with a vertical dimension not substantially less than the width of the welding gap and connecting the discharge ends of said pouring gates above the welding gap and adapted to collect gases and slag inclusions as the weld metal fills the mold cavity, constricted bracket-forming mold cavity sections extending outwardly from the welding gap to either side of the rail webs; said pouring gates and said directional flow channel having a width measured across the gap which is less than the width of the gap after preheating of the rails and being so constructed and arranged that they direct weld metal in two streams through the welding gap between the rail heads without contacting rail metal, through said bracket-forming sections of the mold cavity on either side of the rail webs and then to the bottom of the mold, spattering of the weld metal on the rails being prevented by said directional flow channel.

EDWARD F. BEGTRUP.

REFERENCES CITED

The following references are of record in the file of this patent:

UNITED STATES PATENTS

| Number | Name | Date |
| --- | --- | --- |
| 840,153 | McKee et al. | Jan. 1, 1907 |
| 1,556,402 | Begtrup | Oct. 6, 1925 |
| 1,759,831 | Boegehold | May 27, 1930 |
| 1,795,332 | Deppeler | Mar. 10, 1931 |
| 1,803,374 | Wood | May 5, 1931 |
| 1,917,868 | Begtrup | July 11, 1933 |
| 2,418,649 | Levinson | Apr. 8, 1947 |